(12) United States Patent
Stark

(10) Patent No.: US 9,305,366 B2
(45) Date of Patent: Apr. 5, 2016

(54) PORTABLE ELECTRONIC APPARATUS, SOFTWARE AND METHOD FOR IMAGING AND INTERPRETING PRESSURE AND TEMPERATURE INDICATING

(71) Applicant: Jeffrey Stark, Weehawken, NJ (US)

(72) Inventor: Jeffrey Stark, Weehawken, NJ (US)

( * ) Notice: Subject to any disclaimer, the term of this patent is extended or adjusted under 35 U.S.C. 154(b) by 412 days.

(21) Appl. No.: 13/962,273

(22) Filed: Aug. 8, 2013

(65) Prior Publication Data

US 2014/0043476 A1 Feb. 13, 2014

Related U.S. Application Data

(60) Provisional application No. 61/680,937, filed on Aug. 8, 2012.

(51) Int. Cl.
*H04N 7/18* (2006.01)
*G06T 7/40* (2006.01)
*G06T 7/00* (2006.01)
*G01K 11/12* (2006.01)

(52) U.S. Cl.
CPC .............. *G06T 7/408* (2013.01); *G01K 11/12* (2013.01); *G06T 7/001* (2013.01); *H04N 7/18* (2013.01); *G06T 2207/30108* (2013.01)

(58) Field of Classification Search
None
See application file for complete search history.

(56) References Cited

U.S. PATENT DOCUMENTS

| | | | |
|---|---|---|---|
| 2008/0068590 A1* | 3/2008 | Martinez | G01J 5/0003 356/51 |
| 2008/0095212 A1* | 4/2008 | Jonnalagadda | G01J 5/0003 374/124 |
| 2008/0267445 A1* | 10/2008 | Capewell | G01N 35/021 382/100 |
| 2009/0153658 A1* | 6/2009 | Saveliev | H04N 5/2252 348/135 |
| 2009/0212976 A1* | 8/2009 | Pautsch | G01J 5/0003 340/945 |
| 2010/0002266 A1* | 1/2010 | Takahashi | G03G 15/5062 358/3.06 |
| 2010/0127171 A1* | 5/2010 | Jonsson | H04N 5/332 250/330 |
| 2011/0001809 A1* | 1/2011 | McManus | G01J 5/02 348/61 |
| 2013/0267032 A1* | 10/2013 | Tsai | G01N 21/78 436/95 |

* cited by examiner

*Primary Examiner* — Kate Luo
(74) *Attorney, Agent, or Firm* — Sofer & Haroun, LLP

(57) ABSTRACT

A system for analyzing pressure and/or temperature indicating material has an input for receiving a monochrome color density image captured from a pressure and/or temperature indicating material, the image being captured alongside a calibration target against a contrast sheet. A processing module is configured to receive the captured image of the indicating material and the calibration target and to generate a pseudo colored spectrum map by converting the monochrome color density image into a corresponding multi color map where the different colors on the map correspond to different color densities on the monochrome color density image. The processing module is configured to compare the captured colored calibration target against a stored reference image and to adjust the output pseudo colored spectrum map to account for environmental factors that are present during the capture of the monochrome color density image.

13 Claims, 7 Drawing Sheets

PORTABLE ELECTRONIC APPARATUS, SOFTWARE AND METHOD FOR IMAGING AND INTERPRETING PRESSURE AND TEMPERATURE INDICATING

RELATED APPLICATION

This application claims the benefit of priority from U.S. Provisional Application No. 61/680,937, filed on Aug. 8, 2012, the entirety of which is incorporated by reference.

BACKGROUND

1. Field of Invention

The present arrangement relates to a method for analyzing pressure or temperature indicating films, paper or other media herein after referred to as "indicating materials." More particularly, the invention provides a system and method for producing an enhanced image of an indicating material and offers interpretation of the results using a handheld portable device with a camera.

2. Description of Related Art

Indicating materials are used in various industries in order to measure either temperature or pressure between two contacting surfaces, with the indicating material registering the temperature or pressure results as a color image. Such indicating materials may be difficult to interpret particularly for lesser skilled or experienced workers. As a typical example indicating materials often function by expression of a variety of color densities within a single color, such as magenta, where higher pressures are indicated by darker magenta tones and lighter pressures are indicated by lighter magenta tones. The color density on some indicating materials is correlated to the level of pressure applied and is thus quantifiable by measuring such color density. In such images it is difficult with the naked eye to judge where one color density transitions into another, even with the assistance of a visual color density correlation chart. Thus even experienced users have difficulty in effectively determining what might be minor variations in color intensities exhibited by these indicating materials, and require analysis by optical imaging equipment for better results.

Currently, there is no handheld or photographic type camera system that exists that can perform on-sight and instant analysis of such indicating materials. In order to do this type of analysis in the prior art, the user had to rely on an expensive computer-based software system and an optical image scanner. Alternatively, the user is often required to send the indicating materials out for analysis by a $3^{rd}$ party. Going this route can add days to obtain interpretation of the results revealed by the indicating materials.

OBJECTS AND SUMMARY

The present arrangement offers the user many advantages such as portability, ease of use, benefit from the low cost and ubiquity of handheld devices with built in cameras, and nearly instantaneous analysis for the customer using the indicating materials. For example, the present arrangement relates to a method to analyze the results from using indicating materials that provides an enhanced image and offers interpretation of the results using a handheld portable device with a camera. Such a system enables users of such indicating materials to get interpreted results onsite and nearly instantaneously. The method allows ease of sharing the information with others almost instantaneously. Previously, this type of analysis was performed off-site with specialized equipment or by actually purchasing this specialized equipment. The present arrangement is useful to engineers and scientists and technicians to enable them to quickly and inexpensively reveal contact pressure or temperature distribution and potential magnitude of such between two contacting surfaces as captured by the indicating materials.

The present arrangement may be implemented in the form of a software product that runs on a handheld device containing a camera, such as those that come with most cell phones and other handheld devices, to focus upon and capture an image of pressure or temperature distribution that is revealed by various types of indicating materials (for example Fujifilm Prescale™ or Pressurex Micro Green™, or Thermex™).

In one exemplary embodiment, the system enables users of such indicating materials to get interpreted results onsite and nearly instantaneously. The method allows ease of sharing the information with others almost instantaneously as the results may be generated on a communication device in the first place. Previously, as noted above when describing the prior art, this type of analysis was performed offsite with special equipment. The invention is useful to engineers, technicians and scientists to extract information from indicating materials that allows for the quick, inexpensive and easy interpretation and revelation of contact pressure distribution between two surfaces.

In one embodiment, the system and method may be implemented in the form of software installed onto a handheld device. The software interacts with the device's camera, flash, and accelerometer and gyroscopic or other orientation systems to allow optimal photographing of indicating materials. Use of the accelerometer and/or other gyroscopic and orientation sensors in conjunction with a color calibration target element placed to the side of the scanned image allows the user to take a well aligned (planar to the photographed surface) and well focused image. The better aligned and better focused the captured image, the higher the quality, accuracy, and reliability of the final rendering. The software overrides the device's flash function to ensure it does not fire. Optimal imagery is obtained by virtue of controlling the lighting, image distance, image planarity and image focus. Further, optimal imagery is enhanced by inclusion of a calibration target which contains color swatches in the photo with known parameters encoded in the software that allow the software to adjust and modify the image to achieve quantifiable readings of pressure level.

Once the image is captured the calibration target that contains dimensional as well as colorimetric data allows for the software to impose dimensional markings, such as a ruler type image, upon the resultant image. The system identifies contrast between a background contrast sheet, which in one preferred embodiment is bright white (brightness above 85), and is able to perform edge detection and crop out the image from the background. Then, the present arrangement generates a pseudo colored image selected by the user's choice of several "false" color spectrums, to the monochromatic image, rendering a fully colored image of pressure or temperature distribution in a wide range of colors that makes it easier to see pressure or temperature variation than the unaided eye. The user has the option to render these pseudo color images or maps with a variety of different close spectrums (rainbow, fire, etc. . . . ) The enhanced colors make it easier for the user of the indicating materials to interpret the pressure or temperature distribution made visible by the film.

Photographic interpretation varies from device to device depending upon a variety of factors such as age of the device, resolution, CCD quality, clarity and quality of the lens, cleanliness of the lens, etc. Without the techniques applied that are presented in this patent the value of a simple photographed image would he close to worthless for any form of real scientific assessment.

As such, it is a first object of the invention to provide a method for analyzing pressure or temperature distribution revealed by indicating materials that uses a handheld device containing a camera and provides enhanced images and a technical interpretation report to the user. The present arrangement as described herein, including the calibration target, uses the accelerometer and gyroscope, contrast sheet, color swatches on calibration target etc. . . . , allowing a handheld or portable device to produce useful interpretable images for interpretation by the user of the pressure and/or temperature indicating materials.

It is another object of the invention to provide the user the ability to capture the image appropriately, provide an enhanced colorized image, and provide useful statistics about the image that aids interpretation of the results revealed by the indicating materials.

It is another object of the invention to provide instantaneous or near instantaneous image analysis in a handheld device that allows sharing of the results through wireless or connected devices and modes of communication such as entails, text-picture messages, or standard printed reports.

It is another object of the invention to provide for the use of a high contrast background sheet and a colored calibration target possibly placed on or printed on the background sheet. Such background contrast sheet and calibration target together aid in the determination of the physical dimensions, planarity, focus, pressure or temperature magnitude, precise color level and edge detection of the image photographed.

is an object of the invention to use this information to provide any necessary corrections for any environmental or light condition interference introduced during the collection of the image of the indicating materials.

It is another object of the invention to provide edge detection, established for the purpose of cropping the actual indicating materials image from the background sheet.

It is another object of the invention to provide a colored calibration target element. The characteristics of this element (e.g. color density and color space characteristics and dimensional size and shape and focus bars) are pre-programmed into the software or programmed by the user from a code written on the colored calibration target. By knowing the colored calibration target's color characteristics in advance, the system has the ability to adjust the image's color and therefore allow for magnitude of temperature or pressure determination of the images generated from the indicating materials. By knowing the colored calibration target's dimensions and line widths the software can determine the image's dimensions as well as whether the image is properly focused.

It is another object of the invention to provide a hand held image analysis and enhancement for onsite analysis of pressure and temperature distribution and instantaneous analysis.

To this end, the present arrangement provides a system for analyzing pressure and/or temperature indicating material having an input for receiving a monochrome color density image captured from a pressure and/or temperature indicating material, the image being captured alongside a calibration target against a contrast sheet. A processing module is configured to receive the captured image of the indicating material and the calibration target and to generate a pseudo colored spectrum map by converting the monochrome color density image into a corresponding multi color map where the different colors on the map correspond to different color densities on the monochrome color density image. The processing module is configured to compare the captured colored calibration target against a stored reference image and to adjust the output pseudo colored spectrum map to account for environmental factors that are present during the capture of the monochrome color density image.

BRIEF DESCRIPTION OF THE DRAWINGS

The present invention can be best understood through the following description and accompanying drawings, wherein.

DESCRIPTION OF THE INVENTION

Figure 1:
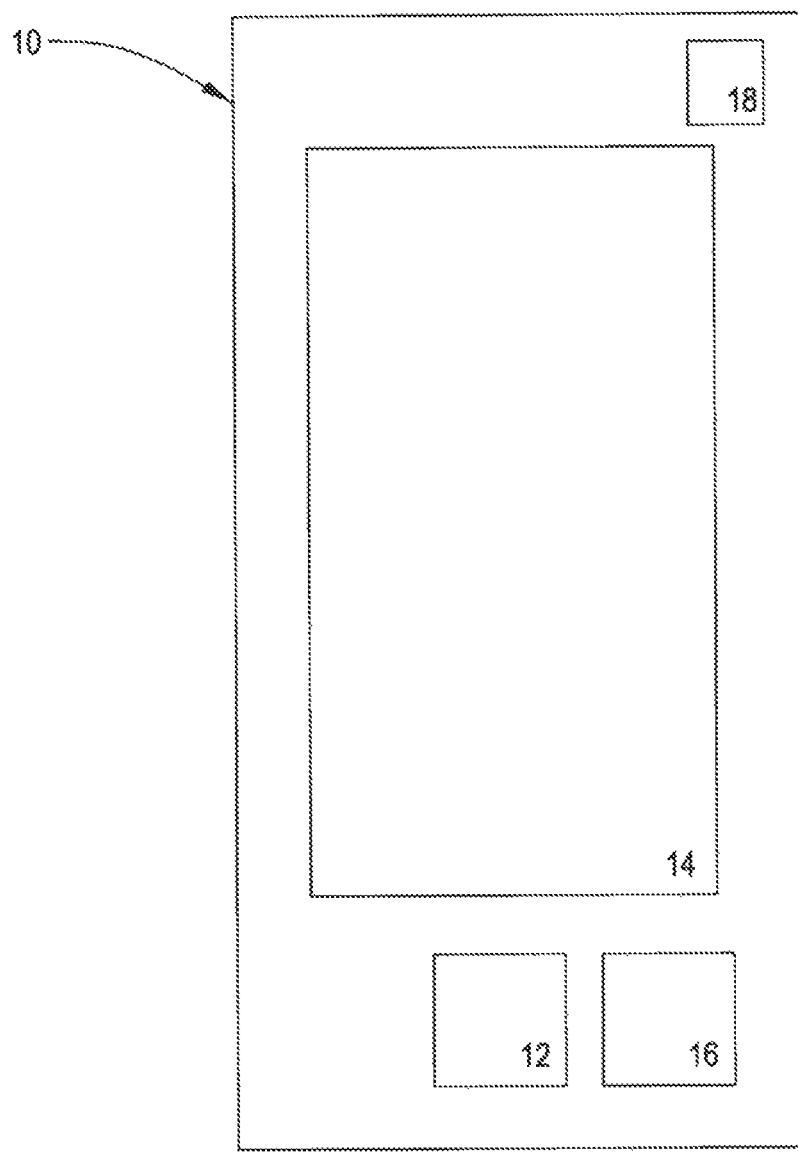
FIG. 1 shows an exemplary schematic of a hand held device for use in implementing the present system and method.

The present arrangement as shown for example in FIG. 1 includes a portable electronic device 10. Such device may be any form of portable/handheld electronic device, such a tablet computer, lap top, etc., but is preferably a mobile/smart phone device. Such device 10 has a processor 12, a display 14, a memory 16 and a camera 18 as well as other feature such as an accelerometer and gyroscope, for implementing the features of the present invention. For the purpose of illustrating the salient features of the invention, the present arrangement is discussed in terms of a mobile/smart phone hardware device implementing the method of analysis via a software/application loaded on device 10. However, this is not intended to limit the scope of the invention. The present arrangement, implemented in other manners and on other similarly capable devices, is within the contemplation of the present invention.

Figure 2:
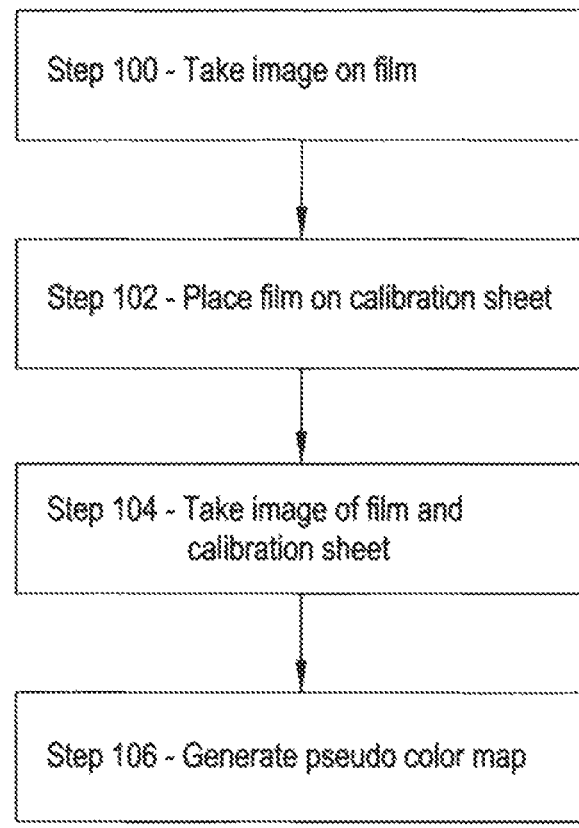
FIG. 2 is a flow chart illustrating the salient features of the present method.
Figure 4:
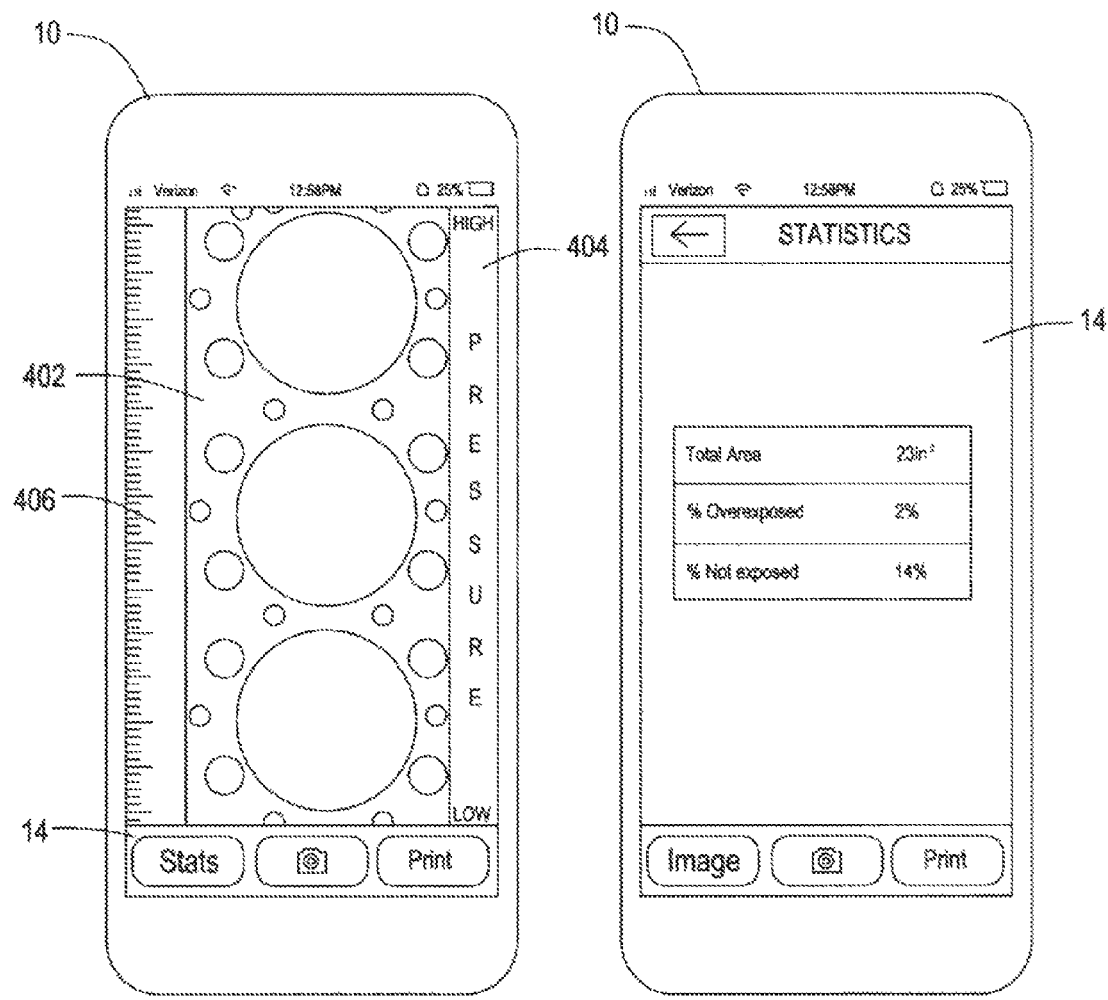
Figure 5:
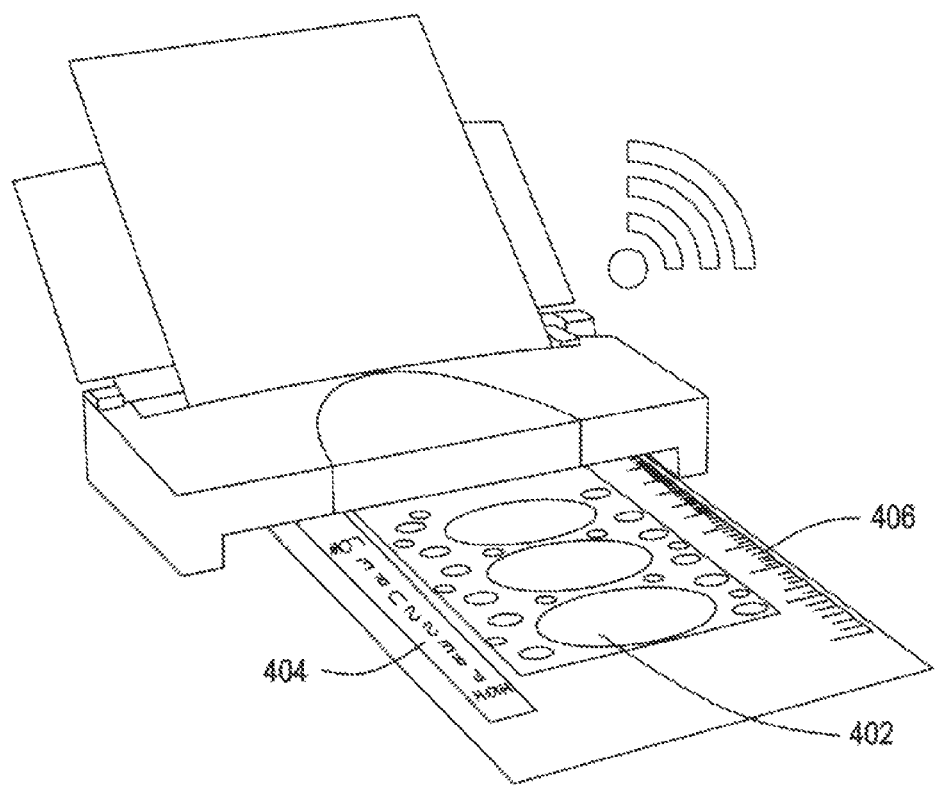

In one arrangement an operating application or software is installed in memory 16 and processor 12 of device 10. Turning to the implementation of the present system and method, FIG. 2 illustrates an exemplary flow chart for the process of analyzing pressure and/or temperature sensitive films and FIGS. 3-5 illustrate various accompanying images to accompany the explanation of such process.

Figure 3:
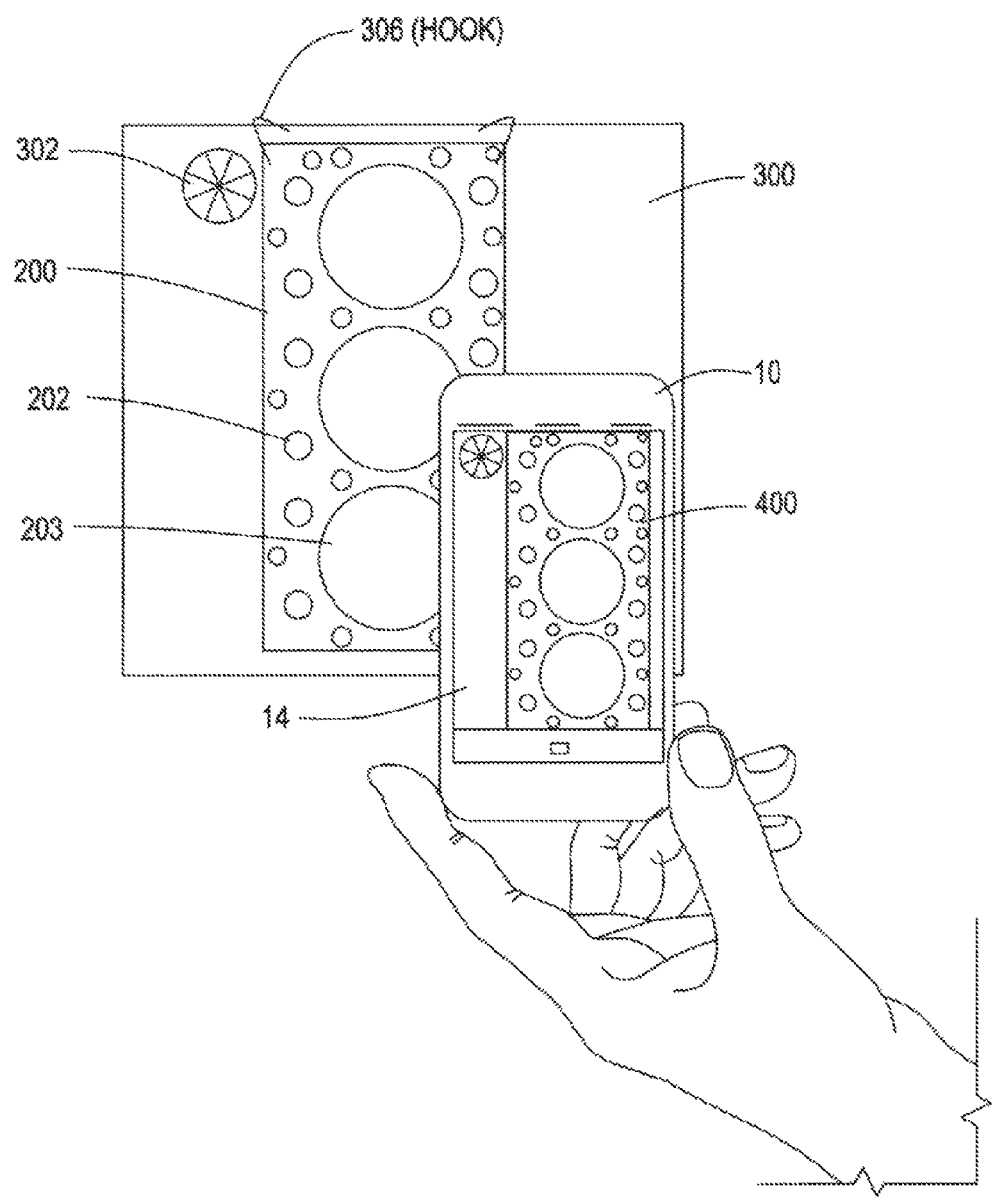
FIGS. 3-5 are images of an exemplary hand held device for use in implementing the present system and method.

At step 100, as shown in FIG. 3, a user begins by generating an image 202 on a pressure and/or temperature indicating film 200 according to the ordinary procedures for such image capture. As noted above, the term "indicating materials" 200 is used generically for pressure and/or temperature indicating films through this specification. Exemplary image 202 on indicating material 200 in FIG. 3 is a pressure image of a gasket head of an engine cylinder head (1/2). The image has several unexposed (zero pressure) areas 203 with the remainder of image 202 being a monochromatic color in varying color densities, representing higher (darker and lower (lighter) pressures. As noted above, such raw images 202 on indicating material 200, although accurately representing variations in pressure, the monochromatic colors make it difficult to pinpoint pressure changes (pressure change/color change lines) with the naked eye.

in the next step 102, also shown in FIG. 3, the user places indicating material 200 onto a backing or contrast sheet 300 having a calibration target/reference image 302 thereon. This may be done by a hook or other attachment means. Ideally, contrast sheet 300 is pure white in color so that it is possible to get good image delineation against the background. Calibration target 302 is both a size and color scale image that is used by the present arrangement to judge the size of image 202 (by reference) as well as to adjust for background lighting. For the purposes of illustration contrast sheet is an independent white paper with calibration target 302 printed thereon. However, it is understood that other arrangements may be used. For example if available to the user a plain white surface or white wall may be used in lieu of contrast sheet 300 and an independent calibration target 302 can simply be placed on such plain white surface.

Returning to the function of calibration target 302, in one embodiment, calibration target 302 is a circle of two inches in diameter. When an indicating material 200 with image 202 is placed next to it, it is easy to determine how large image 202 is by simple comparison. Regarding coloring, calibration target 302 is in the same monochrome color scale as indicating material 200, so if for example indicating material 200 uses a magenta scale, the calibration target 302 is also in the same magenta scale. Calibration target 302 may scale from white/light at the center to dark magenta at the outer edge to show a color density scale reference image. It is contemplated that contrast sheet 300 and calibration target 302 are provided to the user with indicating material 200 so that the colors match. Thus, if a different color indicating material 200 is used, it will likewise be accompanied by a contrast sheet 300 and calibration target 302 of a corresponding color.

Figure 6:
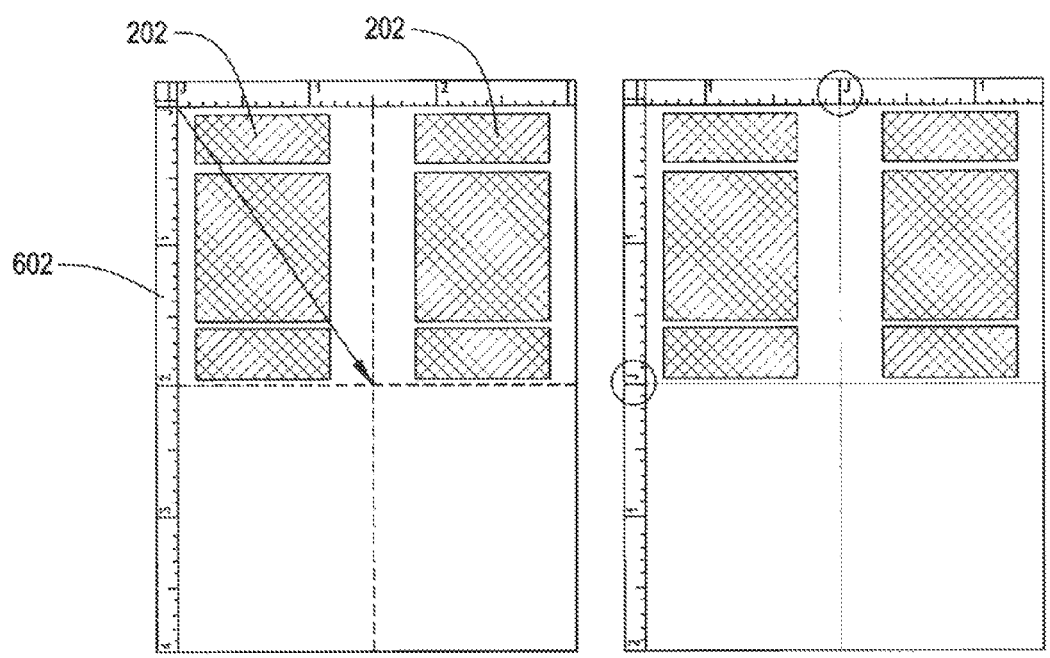
FIG. 6 shows a colored calibration target allowing for dimensional markings.

At the next step 104, shown in FIG. 3, the user uses camera 18 of device 10 to collect an electronic copy 400 of image 202 from indicating material 200. As shown in FIG. 3, film 200 is hung on contrast sheet 300 next to calibration target 302, such that both image 202 and calibration target 302 are captured in the electronic image 400. As an additional feature, once image 202 is captured, the present arrangement may allow for dimensional markings 602 (a ruler type image) to be placed upon image 202 as illustrated in FIG. 6 which may be utilized in further analysis as discussed in more detail below.

Although the present arrangement, such as the image capture and analysis software stored in memory 16 and processor 12, includes color analysis material that is capable of reading the different color densities on the monochromatic image 202, because the image is being captured using camera 18 on device 10, there are environmental factors such as room lighting which can affect the colors captured in image 400. By capturing calibration target 302 at the same time and in the same light and conditions as image 202, image 400 captured on device 10 is not only referenced by color but it is also captured under the same conditions as the calibration target.

Figure 7:
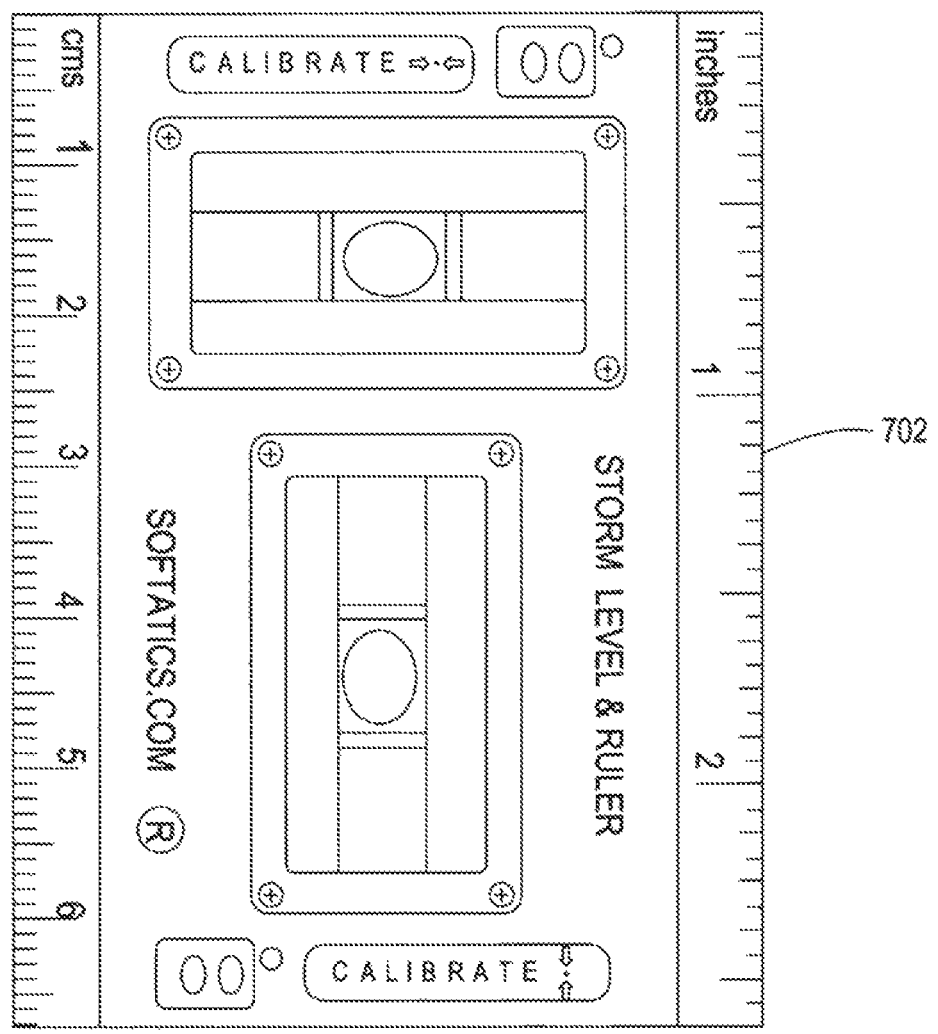
FIG. 7 shows a hand held image analysis for pressure and temperature distribution.

As noted above in the summary, device 10 in the case of being a smart-phone or otherwise being outfitted with an accelerometer, is ideally configured to capture the angle of the device relative to perpendicular so that any variations between the indicating material 200 and contrast sheet 300/calibration target 302 can be adjusted for if required. This may be done in either a vertical wall mount configuration or alternatively in a horizontal desktop arrangement. To this end, device 10 is preferably provided with a leveling functionality using the accelerometer and gyroscope to make sure that device 10 is parallel to image 202 so as to avoid any skewing of the results during the image capture. An exemplary leveling function image 702 may be displayed on display 14 of device 10 to assist the user in this respect as depicted in FIG. 7.

In another embodiment, the present system may indicate to the user whether calibration target 302 and film image 202 are in focus and may allow for detection and correction of shadows and wrinkles. The system may also let the user know when they are too close or too far from calibration target 302 using distance scanning algorithms. The software will automatically disable the flash feature if it exists in camera 18.

At step 104, colored calibration target 202 appears on display 14 of device 10. Colored calibration target 302 is advantageously affixed onto a contrast sheet 300 of pure white coloration (e.g. brightness of 100 or higher). Contrast sheet 300 easily allows for the cropping of image 202 from background 106, focus integrity, dimensional determination (determine length and width of the object if it's square) and parallelism of camera 18 to the surface of calibration target 302. Contrast sheet 300 may additionally contain a hook 306 so as to allow it's fixture to a wall or other vertical surface allowing photos to be taken of the pressure or temperature from a hanging position upon the wall.

Referring to FIG. 4, once the pressure or temperature film is captured as image 400 by camera 18, at step 106, a false color or pseudo-color map 402 is generated by processor 12. This pseudo color spectrum map 402, rather than being in the monochrome color of image 202, converts the monochrome color density image 202 into a multi-color map 402 where different colors are assigned to different color densities from image 202. For example, in the present example if image 202 is a monochrome color density image using magenta, then pseudo-color map 402 generated by processor 12 will have the same dimensions but instead of using one color will re-represent darker color dense regions of image 202 as purple/violet colors on map 402 with lighter color dense regions of image 202 re-represented on map 402 as red color, with the in-between color densities of image 202 represented using the various colors of the visible spectrum (red-orange-yellow-green-blue-violet) for the mid range color densities of image 202.

It is noted that the user can select which color spectrum is used for map 402. For example, instead of spreading a single color from image 202 into a wide ranging pseudo-color map 402, pseudo-color map 402 may instead simply be a two color or three color image, depending on the clarity and desire of the user.

When the color spectrum for map 402 is chosen, the new color assigned to each optical density level of the original image 202 exaggerates the differences between the highest and lowest pressures or temperatures of image 202. As shown in FIG. 4, the present arrangement additionally exhibits a color bar 404 to the right side of the colorized image that explains the range of pressure or temperature exhibited in color map 402. To the left of color map 402, a ruler scale 406 shows the physical dimensions of image 202 and so that features within image 202 can be properly referenced using map 402.

As noted above, and shown in FIG. 4, the present arrangement can analyze the size of the object from image 202 using a comparison to the color calibration target 302, and can provide analytical information about the total area (e.g. in$^2$); % area in regions of maximum pressure or temperature and % white area (not exposed), which are regions of temperature or pressure below a set threshold. Thus the present arrangement is configured to determine pressure magnitude by interpretation of the color intensity of image 202 and to generate a corresponding color spread map 402 that is capable of being more easily interpreted using the naked eye. The present arrangement includes a zoom feature allowing a tap upon display 14 to focus and expand a particular area of map 402.

In one arrangement as shown in FIG. 5, pseudo-colored image map 402 since it is captured in a wireless device 10 can be easily transmitted via Bluetooth, wifi, through the internet/ cloud or other wireless means to a portable or stationary printer for easy evaluation as a paper copy would necessarily be larger than map 402 viewable on display 14 of device 10. The stored map 402 and its associated statistics can additionally be stored as a PDF and sent via email. Alternatively, map 402 can be uploaded from the cell phone to a computer and shared via email or to a connected printer.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

I claim:

1. A system for analyzing pressure and/or temperature indicating material, said system comprising:
    an input for receiving a monochrome color density image captured from a pressure and/or temperature indicating material, said image captured alongside a calibration target against a contrast sheet; and
    a processing module configured to receive said captured image of said indicating material and said calibration target and to generate a pseudo colored spectrum map by converting said monochrome color density image into a corresponding multi color map where said different colors on said pseudo colored spectrum map correspond to different color densities on said monochrome color density image,
    wherein said processing module is configured to compare said captured calibration target against a stored reference image and to adjust said output pseudo colored spectrum map to account for environmental factors that are present during said capture of said monochrome color density image.

2. The system of claim 1 wherein said portable electronic device is a mobile device, selected from the group consisting of, smart phone devices, tablet computers, handheld mobile touch screen devices and lap top computers.

3. The system of claim 2, wherein said input is a camera disposed on said mobile device.

4. The system of claim 3, wherein said mobile device includes a gyroscopic and/or accelerometer such that said mobile device may be held parallel to said monochrome color density image during capture.

5. The system of claim 2, wherein said system is configured to be implemented as a software on said device.

6. The system of claim 2, wherein said system is configured to disable a flash feature of said camera of said device.

7. The system as claimed in claim 1 wherein said contrast sheet is white.

8. The system of claim 7, wherein said calibration target is in the same monochromatic color scale as said image on said indicating material.

9. The system of claim 8, wherein said contrast sheet and said calibration target are provided to a user of said system as combination with said indicating material.

10. The system of claim 1 wherein said contrast sheet contains a hook for affixing said indicating material, when said contrast sheet is mounted on a vertical surface.

11. The system of claim 1 wherein said pseudo colored image map can be transmitted via email.

12. A method for imaging and interpreting pressure and/or temperature indicating materials comprising the steps of:
    receiving an exposed indicating material with a monochrome color density image thereon;
    placing said indicating material onto a contrast sheet having a calibration target;
    collecting an electronic copy of the monochrome color density image and the calibration target;
    comparing said captured calibration target against a stored reference image; and
    generating a pseudo color map by translating the color densities on said monochrome color density image into a multi color spectrum, wherein said generated pseudo color map is adjusted to account for environmental factors that are present during said capture of said monochrome color density image from said indicating material.

13. Components for use with a system for analyzing pressure and/or temperature indicating material, said components comprising:
    a contrast sheet; and
    a color calibration target disposed on said contrast sheet,
    wherein said contrast sheet and said color calibration target are configured to have a pressure and/or temperature indicating material having a monochrome color density image placed thereon so that said a monochrome color density image and said color calibration target may have their image captured together, and
    wherein said color calibration target is configured to provide a reference for said monochrome color density image so that a pseudo colored spectrum map may be generated from said monochrome color density image where different colors on said pseudo colored spectrum map correspond to different color densities on said monochrome color density image,
    wherein said color calibration target is configured to be used as a comparison against a stored reference image to allow for adjustments to said pseudo colored spectrum map to account for environmental factors that are present during said capture of said monochrome color density image.

* * * * *